(12) United States Patent
Hirose et al.

(10) Patent No.: US 12,275,805 B2
(45) Date of Patent: Apr. 15, 2025

(54) METHOD FOR PRODUCING POLYSACCHARIDE ESTER

(71) Applicants: NATIONAL UNIVERSITY CORPORATION KANAZAWA UNIVERSITY, Kanazawa (JP); DAICEL CORPORATION, Osaka (JP)

(72) Inventors: Daisuke Hirose, Kanazawa (JP); Masashi Genda, Kanazawa (JP); Naoki Wada, Kanazawa (JP); Kentaro Taki, Kanazawa (JP); Kenji Takahashi, Kanazawa (JP); Hiroyuki Matsumura, Tokyo (JP)

(73) Assignees: NATIONAL UNIVERSITY CORPORATION KANAZAWA UNIVERSITY, Kanazawa (JP); DAICEL CORPORATION, Osaka (JP)

( * ) Notice: Subject to any disclaimer, the term of this patent is extended or adjusted under 35 U.S.C. 154(b) by 721 days.

(21) Appl. No.: 17/616,352

(22) PCT Filed: Jun. 4, 2019

(86) PCT No.: PCT/JP2019/022237
§ 371 (c)(1),
(2) Date: Dec. 3, 2021

(87) PCT Pub. No.: WO2020/245929
PCT Pub. Date: Dec. 10, 2020

(65) Prior Publication Data
US 2022/0325004 A1 Oct. 13, 2022

(51) Int. Cl.
*C08B 3/00* (2006.01)
*B29C 48/40* (2019.01)
(Continued)

(52) U.S. Cl.
CPC ............... *C08B 3/06* (2013.01); *B29C 48/40* (2019.02); *B29K 2001/12* (2013.01)

(58) Field of Classification Search
CPC ............... C08B 3/00; C08B 3/06; C08B 3/18
See application file for complete search history.

(56) References Cited

U.S. PATENT DOCUMENTS 10,323,101 B2 6/2019 Kakuchi et al.
2015/0376835 A1* 12/2015 Luo ..................... D21H 13/06
162/157.6
(Continued)

FOREIGN PATENT DOCUMENTS

CN 103280504 A 9/2013
JP 2017-190437 A 10/2017
(Continued)

OTHER PUBLICATIONS

Extended European Search Report for European Application No. 19931661.3, dated Nov. 17, 2022.
(Continued)

*Primary Examiner* — Caixia Lu
(74) *Attorney, Agent, or Firm* — Birch, Stewart, Kolasch & Birch, LLP

(57) ABSTRACT

Provided is a method that enables industrially efficient production of an esterified polysaccharide product. A method for producing an esterified polysaccharide product, the method including reacting a polysaccharide-containing biomass, a basic ionic liquid with a pKa of a conjugate acid of an anion from 2 to 19 as a calculated value in a vacuum, and an esterifying agent using a kneader equipped with a shear force application mechanism. A cation constituting the basic ionic liquid is preferably one selected from the group consisting of an imidazolium cation, a pyridinium cation, and a tetraalkylammonium cation.

17 Claims, 1 Drawing Sheet

(51) Int. Cl.
*C08B 3/06* (2006.01)
*C08B 3/18* (2006.01)
*B29K 1/00* (2006.01)

(56) References Cited

U.S. PATENT DOCUMENTS

2017/0114154 A1* 4/2017 Shabelina ............... C11D 3/39
2018/0022832 A1* 1/2018 Kakuchi ............... C08B 11/00
　　　　　　　　　　　　　　　　　　530/505

FOREIGN PATENT DOCUMENTS

JP　　　2019-73625 A　　5/2019
WO　WO 2016/068053 A1　5/2016

OTHER PUBLICATIONS

Kakuchi et al., "A mechanistic insight into the organocatalytic properties of imidazolium-based ionic liquids and a positive co-solvent effect on cellulose modification reactions in an ionic liquid", RSC Advances, vol. 7., No. 16, Jan. 1, 2017, pp. 9423-9430.

Gibril et al., "Reactive extrusion process for the preparation of a high concentration solution of cellulose in ionic liquid for in situ chemical modification," RSC Advances, vol. 3, 2013, pp. 1021-1024.

International Preliminary Report on Patentability and English translation of the Written Opinion of the International Searching Authority for International Application No. PCT/JP2019/022237, dated Dec. 7, 2021.

International Search Report for International Application No. PCT/JP2019/022237, dated Sep. 3, 2019, with English translation.

Suzuki et al., "Cellulose triacetate synthesis via one-pot organocatalytic transesterification and delignification of pretreated bagasse," RSC Advances, vol. 8, 2018, pp. 21768-21776.

Zhang et al., "Chemical modification of cellulose by in situ reactive extrusion in ionic liquid." Carbohydrate Polymers, vol. 99, 2014 (Available online Aug. 14, 2013), pp. 126-131.

Japanese Office Action for Japanese Application No. 2021-524555, dated Mar. 14, 2023.

* cited by examiner

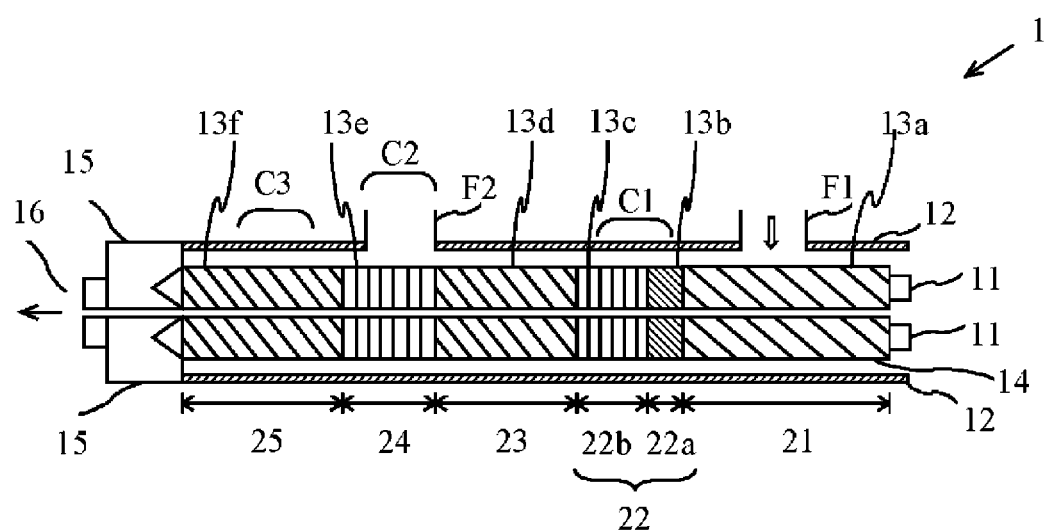

US 12,275,805 B2

METHOD FOR PRODUCING POLYSACCHARIDE ESTER

TECHNICAL FIELD

The present invention relates to a method for producing an esterified polysaccharide product.

BACKGROUND ART

In recent years, ionic liquids have been proposed as solvents for dissolving biomass containing a polysaccharide, such as cellulose or lignocellulose, (which may be hereinafter referred to as "polysaccharide-containing biomass"), and techniques for derivatization of a polysaccharide under a homogeneous reaction system using the ionic liquid have been introduced. Ionic liquids have extremely low volatility, pose no risk, such as contamination and ignition due to volatility, and have strong ability of dissolving cellulose or the like, and thus research and development are underway for use as solvents in processing polysaccharides.

For example, Example 1 of Patent Literature 1 describes that 120 mg of bagasse (sugar cane residue) was dissolved in 4 g of 1-ethyl-3-methylimidazolium acetate that is an ionic liquid (bagasse concentration in the ionic liquid: 3 wt. %), the solution was vacuum-dried under stirring conditions at 80° C. overnight, then 4 mL of isopropenyl acetate was added to the reaction system, and a polysaccharide derivative (cellulose acetate) in a solid state was obtained from the reaction solution by reprecipitation with methanol followed by filtration.

In addition, Non-Patent Literature 1 describes that 600 mg of bagasse was dissolved in 10 mL of 1-ethyl-3-methylimidazolium acetate (bagasse concentration in the ionic liquid: 6 wt. %) in a Schlenk tube, the solution was stirred for 16 hours to obtain a dark brown homogeneous viscous solution, then an excess amount (20 mL) of isopropenyl acetate was added to the solution, the mixture was stirred for 30 minutes to acetylate, and a highly viscous reaction mixture (cellulose acetate, total degree of substitution: about 3) was obtained from methanol-insoluble portion.

Furthermore, Non-Patent Literature 2 describes that cellulose, 1-butyl-3-methylimidazolium chloride that is an ionic liquid, and succinic anhydride were mixed in a specific ratio (weight ratio) using a high-speed universal grinder, the resulting mixture was extruded with a twin-screw extruder (reaction time: about 2 to 3 minutes), the extruded material was precipitated in water and filtered, and a cellulose derivative (cellulose succinate) was obtained. However, even reacting the mixture of cellulose, 1-butyl-3-methylimidazolium chloride, and succinic anhydride at a ratio of 1:5:1 (weight ratio) produces a cellulose derivative with a total degree of substitution of only 0.245.

In addition, Non-Patent Literature 3 describes that cellulose, 1-butyl-3-methylimidazolium chloride, and a reaction inducer selected from the group consisting of urea, phthalic anhydride, maleic anhydride, and butyl glycidyl ether were mixed at 1:3:1 (weight ratio) using a blender, the resulting mixture was extruded with a twin-screw extruder (holding time: 10 min), the extruded material was washed sequentially with distilled water and alcohol, and a modified cellulose (total degree of substitution: from 0.24 to 0.61) was obtained.

CITATION LIST

Patent Document

Patent Document 1: WO 2016/068053

Non-Patent Literatures

Non-Patent Literature 1: S. Suzuki, et al., RSC Adv., 2018, 8, 21768-21776.
Non-Patent Literature 2: Magdi E. G., et al., RSC Adv., 2013, 3, 1021-1024.
Non-Patent Literature 3: Y. Zhang, et al., Carbohydrate Polymers. 2014, 99, 126-131.

SUMMARY OF INVENTION

Technical Problem

No method is available for industrially efficient production of an esterified polysaccharide product yet, leaving room for improvement. In particular, no method is known for industrially efficient production of an esterified polysaccharide product under high concentration conditions.

The method described in Non-Patent Literature 1 is esterification performed in a Schlenk tube (batch reactor). However, for the production of an esterified polysaccharide product with a high degree of substitution, large amounts of an organic solvent and reaction reagents (an ionic liquid and an esterifying agent) are required, and these need to be reacted for a long time. Thus, the method described in Non-Patent Literature 1 does not provide the industrially efficient production of an esterified polysaccharide product.

In addition, even a method described in Non-Patent Literature 2 or 3 using a twin-screw extruder to perform reactive extrusion under high shear force produces an esterified polysaccharide product with a total degree of substitution of approximately 0.6 at most.

Thus, an object of the present invention is to provide a method that enables industrially efficient production of an esterified polysaccharide product.

Solution to Problem

As a result of diligent research to solve the above problems, the present inventors found that an esterified polysaccharide product can be industrially efficiently produced by reacting:
a polysaccharide-containing biomass,
a basic ionic liquid with a pKa of a conjugate acid of an anion of 2 to 19 as a calculated value in a vacuum, and
an esterifying agent
using a kneader equipped with a shear force application mechanism. The present invention was completed based on these findings.

That is, the present invention provides the following aspects.

(1) A method for producing an esterified polysaccharide product, the method including reacting:
a polysaccharide-containing biomass,
a basic ionic liquid with a pKa of a conjugate acid of an anion of 2 to 19 as a calculated value in a vacuum, and
an esterifying agent
using a kneader equipped with a shear force application mechanism.

(2) The method for producing an esterified polysaccharide product according to (1) described above, wherein a cation constituting the basic ionic liquid is one selected from the group consisting of an imidazolium cation, a pyridinium cation, and a tetraalkylammonium cation.

(3) The method for producing an esterified polysaccharide product according to (1) or (2) described above, wherein the anion constituting the basic ionic liquid is one selected from the group consisting of a carboxylate anion, an amino acid anion, a cyanide ion, and a fluoride ion.

(4) The method for producing an esterified polysaccharide product according to any of (1) to (3) described above, the method including:

kneading the polysaccharide-containing biomass and the basic ionic liquid to produce a first kneaded product (first kneading); and kneading and reacting the esterifying agent and the first kneaded product to produce a second kneaded product containing an esterified polysaccharide product (second kneading), wherein the kneader equipped with a shear force application mechanism is used at least one of the first kneading or the second kneading.

(5) The method for producing an esterified polysaccharide product according to (4) described above, the method further including:

extruding the second kneaded product while conveying the second kneaded product, wherein the kneader equipped with a shear force application mechanism is used at least two of the first kneading, the second kneading, or the extruding.

(6) The method for producing an esterified polysaccharide product according to (5) described above, wherein at least one of the first kneading, the second kneading, or the extruding is performed continuously.

(7) The method for producing an esterified polysaccharide product according to (5) or (6) described above, wherein a kneader equipped with a screw is used in any of the first kneading, the second kneading, or the extruding.

(8) The method for producing an esterified polysaccharide product according to (7) described above, wherein the first kneading is performed using a kneader equipped with a screw, the polysaccharide-containing biomass and the basic ionic liquid are simultaneously introduced directly above the screw of the kneader.

(9) The method for producing an esterified polysaccharide product according to any of (5) to (8) described above, wherein an organic solvent is used in one or more of the first kneading, the second kneading, or the extruding.

(10) The method for producing an esterified polysaccharide product according to any of (1) to (9) described above, wherein the esterifying agent is one or more selected from the group consisting of a chain ester compound, cyclic ester compound, unsaturated aldehyde, saturated aldehyde, acid halide, acid anhydride, and allyl alcohol.

(11) The method for producing an esterified polysaccharide product according to any of (1) to (10) described above, wherein a weight ratio of the basic ionic liquid to the polysaccharide-containing biomass is from 0.5 to 10 of the basic ionic liquid per 1 of the polysaccharide-containing biomass.

(12) The method for producing an esterified polysaccharide product according to (9) described above, wherein a weight ratio of the basic ionic liquid to 1 of the polysaccharide-containing biomass is from 0.5 to 10, and a weight ratio of the organic solvent to 1 of the polysaccharide-containing biomass is from 0.5 to 10.

(13) The method for producing an esterified polysaccharide product according to any of (1) to (12) described above, wherein a content of a cellulose ester in the esterified polysaccharide product is 80 wt. % or higher.

(14) The method for producing an esterified polysaccharide product according to any of (1) to (13) described above, wherein an equivalent of the esterifying agent relative to 1 equivalent of hydroxyl groups of polysaccharide in the polysaccharide-containing biomass is from 0.5 to 7 equivalents.

(15) The method for producing an esterified polysaccharide product according to (1) to (14) described above, wherein an esterification ratio of hydroxyl groups of polysaccharide in the polysaccharide-containing biomass is 23% or higher.

(16) An esterified polysaccharide product obtained by the method for producing an esterified polysaccharide product described in (1) to (15) described above.

Advantageous Effects of Invention

The method for producing an esterified polysaccharide product according to an embodiment of the present invention enables industrially efficient production of an esterified polysaccharide product using a polysaccharide-containing biomass as a raw material.

BRIEF DESCRIPTION OF DRAWING

FIG. 1 is an explanatory diagram illustrating a configuration of a twin-screw kneading extruder used in Examples of the present invention.

DESCRIPTION OF EMBODIMENTS

Hereinafter, embodiments of the present invention will be described in detail. A method for producing an esterified polysaccharide product according to an embodiment of the present invention is characterized by reacting:

a polysaccharide-containing biomass,
a specific basic ionic liquid, and
an esterifying agent
using a kneader equipped with a shear force application mechanism.

Polysaccharide-Containing Biomass

The polysaccharide-containing biomass applicable to the present invention is any biomass containing a polysaccharide and is not particularly limited. Examples include bagasse (sugar cane residue): kenaf; wood, such as Japanese cedar, eucalyptus, Japanese red pine, poplar, lauan, Japanese cypress, monarch birch, and Sitka spruce; shells of crustaceans, such as crabs and shrimps; cereals, such as rice, wheat, corn, and sorghum; potatoes and similar plants, such as a potato, a sweet potato, and cassava; and other cellulosic plant-derived raw materials (pulp waste liquid; rice straws; chaff; fruit fibers; fruit kernel shells, such as those of ginkgo nuts; and empty fruit bunches). In addition, pulp or the like refined from these biomasses can also be used. Prior to employment of the method for producing an esterified polysaccharide product according to an embodiment of the present invention, the polysaccharide-containing biomass may be subjected to various pretreatments, such as cutting and drying, as necessary and undergo separation and extraction of a polysaccharide (e.g., cellulose) to be transformed into a state of a polysaccharide. Only one kind, or two or more kinds of the polysaccharide-containing biomasses described above may be used.

The polysaccharide contained in the biomass is not particularly limited and may be any common polysaccharide. A plurality of polysaccharides may be used in combination. Examples of the polysaccharide include cellulose, hemicellulose, xylan, mannan, glucomannan, glucuronoxylan, starch, amylose, amylopectin, glycogen, dextrin, pectin, chitin, chitosan, agarose, carrageenan, isolichenan, laminaran, lichenan, glucan, inulin, levan, fructan, galactan, arabinan, pentosan, alginic acid, pectic acid, protuberic acid, colominic acid, porphyran, fucoidan, ascophyllan, locust bean gum, guar gum, tamarind gum, tara gum, and gum arabic. Part of the structure of the polysaccharide may be substituted. For example, a cellulose derivative in which some of the hydroxyl groups of cellulose are esterified may be used as a raw material.

Basic Ionic Liquid

In general, an ionic liquid refers to a salt composed of a cation and an anion, the salt present as a liquid at relatively low temperatures (e.g., 150° C. or lower). The basic ionic liquid used in an embodiment of the present invention refers to an ionic liquid with an acid dissociation constant (pKa) of a conjugate acid of an anion of 2 to 19 as a calculated value in a vacuum (which may be hereinafter referred to as the "specific basic ionic liquid"). Only one kind, or two or more kinds of the specific basic ionic liquids described above may be used.

Examples of the cation constituting the specific basic ionic liquid include an imidazolium cation, a pyridinium cation, and a tetraalkylammonium cation.

Specific examples of the cation constituting the specific basic ionic liquid include 1,3-dimethylimidazolium, 1-ethyl-3-methylimidazolium, 1-butyl-3-methylimidazolium, 1-hexyl-3-methylimidazolium, 1-octyl-3-methylimidazolium, 1-decyl-3-methylimidazolium, 1-tetradecyl-3-methylimidazolium, 1-hexadecyl-3-methylimidazolium, 1-octadecyl-3-methylimidazolium, 1-allyl-3-methylimidazolium, 1-ethyl-2,3-dimethylimidazolium, 1-butyl-2,3-dimethylimidazolium, 1-hexyl-2,3-dimethylimidazolium, 1-ethylpyridinium, 1-butylpuridinium, 1-hexylpyridinium, 1-butyl-4-methylpyridinium, 1-butyl-3-methylpyridinium, 1-hexyl-4-methylpyridinium, 1-hexyl-3-methylpyridinium, 1-octyl-4-methylpyridinium, 1-octyl-3-methylpyridinium, 1-butyl-3,4-dimethylpyridinium, 1-butyl-3,5-dimethylpyridinium, and trimethylpropylammonium.

Examples of the anion constituting the specific basic ionic liquid include a halogen anion, a pseudohalogen anion, a carboxylate anion, a phosphate anion, a phenolate, and a pyrimidine olate. In particular, a halogen anion, a carboxylate anion, or a phosphate anion have excellent affinity with the polysaccharide-containing biomass and thus can be suitably employed.

Examples of the halogen anion include, but are not limited to, a fluoride ion.

Examples of the pseudohalogen anion include, but are not limited to, a cyan anion, a thiocyanate anion, a cyanate anion, a fulminate anion, and an azide anion.

Examples of the carboxylate anion include, but are not limited to, a monocarboxylate anion or a dicarboxylate anion having from 1 to 18 carbons. Examples of the carboxylate anion include, but are not limited to, a formate anion, an acetate anion, a propionate anion, a butyrate anion, a valerate anion, a fumarate anion, an oxalate anion, a lactate anion, and a pyruvate anion. The method for producing an esterified polysaccharide product according to an embodiment of the present invention prevents the acylation with an anion even when a carboxylate anion is used as the anion of the specific basic ionic liquid and also enables only the acylation with an esterifying agent described later to proceed. Thus, the method enables industrially more efficient production of the target esterified polysaccharide product.

Examples of the phosphate anions include, but are not limited to, phosphate anions, and phosphate ester anions having from 1 to 40 carbons. Examples of the phosphate anions include, but are not limited to, phosphate anions, methyl phosphate monoester anions, octyl phosphate monoester anions, octyl phosphate diester anions, lauryl phosphate monoester anions, lauryl phosphate diester anions, stearyl phosphate monoester anions, stearyl phosphate diester anions, eicosyl phosphate monoester anions, and eicosyl phosphate diester anions.

In particular, the basic ionic liquid used in an embodiment of the present invention is preferably an ionic liquid in which a cation is represented by Formula (1) below, and a pKa of a conjugate acid of an anion is from 2 to 19 as a calculated value in a vacuum. Such a basic ionic liquid has excellent affinity with and solubility for the polysaccharide-containing biomass. Thus, the basic ionic liquid has a function as a solvent of the polysaccharide-containing biomass and may further have a function as a catalyst for the polysaccharide-containing biomass.

[Chem. 1]

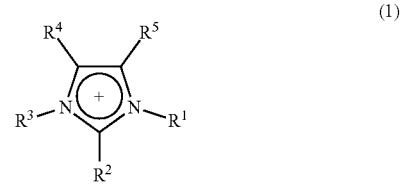

(1)

where $R^1$ and $R^2$ are each independently an alkyl group, an alkenyl group, an alkoxyalkyl group, a substituted or unsubstituted phenyl group; and $R^3$ to $R^5$ are each independently a hydrogen atom, an alkenyl group, an alkoxyalkyl group, a substituted or unsubstituted phenyl group.

Examples of the alkyl group include linear or branched alkyl groups having from 1 to 20 carbons, such as a methyl group, an ethyl group, an n-propyl group, an isopropyl group, a butyl group, a hexyl group, and an octyl group. A sulfo group may be attached to the ends of these alkyl groups. In addition, examples of the alkenyl group include linear or branched alkenyl groups having from 2 to 20 carbons, such as a vinyl group, a 1-propenyl group, a 2-propenyl group, a 1-butenyl group, a 2-butenyl group, a 1-pentenyl group, a 2-pentenyl group, a 1-hexenyl group, a 2-hexenyl group, and a 1-octenyl group. Furthermore, examples of the alkoxyalkyl group include linear or branched alkoxyalkyl groups having from 2 to 20 carbons, such as a methoxymethyl group, an ethoxymethyl group, a 1-methoxyethyl group, a 2-methoxyethyl group, a 1-ethoxyethyl group, and a 2-ethoxyethyl group. Moreover, examples of the substituted or unsubstituted phenyl group include a phenyl group that may be substituted by: a hydroxyl group; a halogen atom; an alkoxy group having from 1 to 6 (or from 1 to 4) carbons; an alkenyl group having from 1 to 6 (or from 1 to 4) carbons; a methylsulfonyloxy group; a substituted or unsubstituted alkyl group having from 1 to 6 (or from 1 to 4) carbons; a substituted or unsubstituted amino group; a substituted or unsubstituted phenyl group; and one or two groups selected from a substituted or unsubstituted phenoxy group and a substituted or unsubstituted pyridyl group.

From the viewpoint of more effectively exerting the solubility for the polysaccharide-containing biomass and the function as a catalyst for the esterification reaction, in Formula (1) above, in the formula, $R^1$ and $R^2$ are preferably each independently an alkyl group, an alkenyl group, or a substituted or unsubstituted phenyl group; $R^3$ is preferably a hydrogen atom; and $R^4$ and $R^5$ are preferably each independently a hydrogen atom, an alkenyl group, or a substituted or unsubstituted phenyl group.

The specific basic ionic liquid has a pKa of the conjugate acid of the anion of 2 to 19, preferably of 3 to 17, and more preferably of 4 to 12 as a calculated value in a vacuum. The specific basic ionic liquid with a pKa of the conjugate acid of the anion within the above range as a calculated value in a vacuum further exerts the function as a catalyst in the esterification reaction. Examples of such an anion include a carboxylate anion, such as a formate anion and an acetate anion; an amino acid anion of various types (such as a glutamate anion); a cyanide ion; and a fluoride ion.

The pKa can be calculated by Advanced Chemistry Development (ACD/Labs) Software V11.02 (c1994-2016 ACD/Labs). For example, the pKa can be obtained from the database, SciFinder (trade name).

In addition, the pKa of the conjugate acid of the anion can also be determined based on the pKa in dimethyl sulfoxide (DMSO). The pKa of the conjugate acid of the anion in this case is, for example, from 9 to 29, preferably from 10 to 25, more preferably from 12 to 19, and even more preferably from 12.3 to 18.6. The pKa refers to a value at 25° C.

Thus, the present invention, in another aspect, provides a method for producing an esterified polysaccharide product, the method including reacting:

a polysaccharide-containing biomass, a basic ionic liquid with a pKa of a conjugate acid of an anion of 9 to 29 in dimethyl sulfoxide at 25° C., and an esterifying agent using a kneader equipped with a shear force application mechanism.

Specific examples of the ionic liquid suitably used in an embodiment of the present invention include, but are not limited to, 1-ethyl-3-methylimidazolium acetate, 1-butyl-3-methylimidazolium acetate, and 1-hexyl-3-methylimidazolium acetate. In addition, from the viewpoint of operability, the specific basic ionic liquid is more preferably a liquid at room temperature but is not particularly limited.

An embodiment of the present invention can reduce the amount of a generally expensive basic ionic liquid to be used. The weight ratio of the specific basic ionic liquid to the polysaccharide-containing biomass is, for example, from 0.5 to 10, preferably from 0.7 to 7, more preferably from 0.8 to 3, even more preferably from 1 to 2.5, and particularly preferably from 1 to 1.5 of the specific basic ionic liquid per 1 of the polysaccharide-containing biomass.

The specific basic ionic liquid can also be identified by the solubility of cellulose. The solubility of a cellulose (number average degree of polymerization: 105) in 1 g of the specific basic ionic liquid is, for example, 0.01 g or higher, preferably 0.05 g or higher, more preferably 0.1 g or higher, even more preferably 0.2 g or higher, and particularly preferably 0.3 g or higher. The above values are solubility at 120° C. For the cellulose with a number average degree of polymerization of 105, a commercially available product can be used, and examples include "Avicel PH-101" (trade name) from Sigma-Aldrich. The number average degree of polymerization in an embodiment of the present invention refers to a number average degree of polymerization determined by size exclusion chromatography (SEC) in terms of a polystyrene calibration standard material (carbanilated cellulose sample reacted with phenyl isocyanate) in tetrahydrofuran (THF). The apparent number average degree of polymerization of "Avicel PH-101" (trade name) according to the measurement method described above is 105.

Organic Solvent

In an embodiment of the present invention, an organic solvent may be used together with the specific basic ionic liquid. The organic solvent can be selected appropriately in consideration of miscibility with the specific basic ionic liquid, affinity with the polysaccharide-containing biomass and the esterified polysaccharide product, viscosity of a mixture of the polysaccharide-containing biomass and the specific basic ionic liquid, and the like. In addition, the organic solvent is preferably one that does not react with the specific basic ionic liquid and has high solubility for the polysaccharide-containing biomass used as a raw material in a state of mixture with the ionic liquid and for an esterified polysaccharide product to be produced. When the organic solvent described above is used, the amount of the specific basic ionic liquid to be used can be reduced and the manufacturing cost of the esterified polysaccharide product can be reduced. Only one kind, or two or more kinds of the organic solvents described above may be used.

The organic solvent can be appropriately selected from among various organic solvents. Specifically, examples include acetonitrile, tetrahydrofuran, dimethylformamide, dimethylacetamide, dimethyl sulfoxide, 1,3-dioxolane, 1,4-dioxane, N,N-dimethylformamide, N,N-dimethylacetamide, 1-methyl-2-pyrrolidone, and pyridine. Chloroform reacts with some ionic liquids, such as 1-ethyl-3-methylimidazolium acetate, and thus may be inapplicable, but is not excluded from the scope of the present invention.

In a preferred embodiment, tetrahydrofuran is preferably used in production of cellulose butyrate, and dimethyl sulfoxide, 1,3-dioxolane, or the like is preferably used in production of cellulose acetate, but the organic solvent is not particularly limited to these.

The weight ratio of the organic solvent to the polysaccharide-containing biomass is, for example, from 0 to 10, preferably from 0.5 to 10, more preferably from 0.7 to 7, even more preferably from 0.8 to 3, particularly preferably from 1 to 2.5, and most preferably from 1 to 1.5 of the organic solvent per 1 of the polysaccharide-containing biomass.

Esterifying Agent

The esterifying agent in an embodiment of the present invention is not particularly limited, and a compound corresponding to the type of an esterified polysaccharide product to be produced can be appropriately selected and used. In particular, from the viewpoint of reactivity, the esterifying agent is preferably one or more selected from the group consisting of chain ester compounds, cyclic ester compounds, unsaturated aldehydes, saturated aldehydes, acid halides, acid anhydrides, and allyl alcohols. Only one kind each, or two or more kinds of the esterifying agents described above may be used.

In an embodiment of the present invention, a compound, such as an unsaturated aldehyde or a saturated aldehyde, with which none but the specific basic ionic liquid reacts can be used as the esterifying agent. When an aldehyde is used, an active ester intermediate produced by oxidation of a Breslow intermediate formed from the specific basic ionic liquid and the aldehyde component reacts with cellulose. In an unsaturated aldehyde, the unsaturated bond acts as an internal oxidant, and in a saturated aldehyde, oxygen in the air functions as an oxidant. Basicity is strongly involved in the formation of the Breslow intermediate, and thus a non-basic ionic liquid does not exhibit catalytic activity for this reaction.

Examples of the chain ester compounds include compounds, such as carboxylic acid alkyl esters (such as methyl acetate) and carboxylic acid alkenyl esters (such as isopropenyl acetate and vinyl acetate). Carboxylic acid alkyl esters, unlike carboxylic anhydrides, have been known as highly stable chemicals in the related art. Thus, to cause an esterification reaction, a highly corrosive acid catalyst (e.g., including inorganic acids, organic acids, and Lewis acids; specifically, sulfuric acid, hydrochloric acid, toluenesulfonic acid, phenolsulfonic acid, aluminum chloride, zinc chloride, and boron trifluoride) has been indispensably used in addition. According to an embodiment of the present invention, the esterification reaction proceeds by using the specific basic ionic liquid under conditions where a high shear force is applied, and thus this enables the esterification reaction to proceed without additionally adding an acid catalyst.

The cyclic ester compound described above is any cyclic ester compound that can undergo ring-opening polymerization, and examples include, but are not limited to, lactones, such as $\beta$-propiolactone, $\delta$-valerolactone, $\varepsilon$-caprolactone, $\alpha,\alpha$-dimethyl-$\beta$-propiolactone, $\beta$-ethyl-$\delta$-valerolactone, $\alpha$-methyl-$\varepsilon$-caprolactone, $\beta$-methyl-$\varepsilon$-caprolactone, $\gamma$-methyl-$\varepsilon$-caprolactone, and 3,3,5-trimethyl-$\varepsilon$-caprolactone; and lactides, such as glycolide and lactide.

When the chain or cyclic ester compound is reacted, two or more kinds of chain or cyclic ester compounds can be used as necessary to introduce different substituents into one molecule of the polysaccharide. For example, simultaneous reaction of a butyrate ester, such as vinyl butyrate, and an acetate ester, such as isopropenyl acetate (IPA), with cellulose can produce cellulose acetate butyrate in which each hydroxyl group of the cellulose molecule is substituted with an acetyl group or a butyryl group. In general, introduction of a substituent, such as a butyryl group, having a longer carbon chain compared to an acetyl group reduces a glass transition point of the product, and thus a change in the blending ratio of the two or more ester compounds can control characteristics of the product, such as formability.

Examples of the unsaturated aldehydes include, but are not limited to, aromatic aldehydes, such as 2-butenal, 2-hexenal, 2-decenal, 2-undecenal, 2-dienal, 2,4-heptadienal, 2,4-decadienal, cinnamaldehyde, and benzaldehyde.

Examples of the saturated aldehydes include, but are not limited to, propanal, hexanal, octanal, and nonanal.

Examples of the acid halides include carboxylic acid fluorides, carboxylic acid chlorides, carboxylic acid bromides, and carboxylic acid iodides. Specific examples of the carboxylic acid halides include, but are not limited to, acetyl fluoride, acetyl chloride, acetyl bromide, acetyl iodide, propionyl fluoride, propionyl chloride, propionyl bromide, propionyl iodide, butyryl fluoride, butyryl chloride, butyryl bromide, butyryl iodide, benzoyl fluoride, benzoyl chloride, benzoyl bromide, and benzoyl iodide. In particular, a carboxylic acid chloride can be suitably employed from the viewpoints of reactivity and handleability.

Examples of the acid anhydrides include, but are not limited to, acetic anhydride, propionic anhydride, butyric anhydride, valeric anhydride, caproic anhydride, enanthic anhydride, caprylic anhydride, pelargonic anhydride, capric anhydride, lauric anhydride, myristic anhydride, palmitic anhydride, stearic anhydride, oleic anhydride, linoleic anhydride, linolenic anhydride, benzoic anhydride, phthalic anhydride, maleic anhydride, and succinic anhydride. In particular, acetic anhydride, propionic anhydride, and butyric anhydride are highly reactive and thus can be suitably employed.

Examples of the allyl alcohols include, but are not limited to, methallyl alcohol, acrylic alcohol, 2-hydroxymethyl-1-butene, and $\alpha$-hydroxymethyl styrene.

An amount of the esterifying agent can be appropriately selected according to various conditions, such as the type of polysaccharide in the polysaccharide-containing biomass, the type of the esterifying agent, the reaction temperature, the reaction time (residence time, holding time), and kneading conditions. The amount of the esterifying agent is, for example, from 0.5 to 20 equivalents, preferably from 0.7 to 15 equivalents, more preferably from 0.7 to 10 equivalents, even more preferably from 0.7 to 7 equivalents, and particularly preferably from 0.7 to 5 equivalents relative to 1 equivalent of hydroxyl groups of polysaccharide in the polysaccharide-containing biomass. Only some of the hydroxyl groups of the polysaccharide may be reacted with the esterifying agent to leave a hydroxyl group in a portion of the resulting esterified polysaccharide product.

In addition, the amount of the esterifying agent can be adjusted according to the degree of reaction of the target esterified polysaccharide product, that is, how many equivalents are esterified relative to 1.0 equivalent of hydroxyl groups present in the polysaccharide (which may be hereinafter referred to as the "target substitution equivalent"). To produce the target substitution equivalent of the esterified polysaccharide product, at minimum the same equivalent of the esterifying agent as the target substitution equivalent is required. In the related art, because of the poor reaction efficiency, the esterifying agent has been commonly used in a large excess relative to the target substitution equivalent. According to an embodiment of the present invention, because of the good reaction efficiency, the target esterified polysaccharide product can be produced with the esterifying agent in 5.0-fold equivalents or less, preferably 2.0-fold equivalents or less, more preferably 1.2-fold equivalents or less, or even the lower limit of 1.0-fold equivalent of the target substitution equivalent from the viewpoint of reducing the amount of the esterifying agent to be used. In addition, from the viewpoint of shortening the reaction time and the like, using a larger amount of the esterifying agent than the minimum equivalent (1.0-fold equivalent) required to achieve the target substitution equivalent, for example, from 1.2-fold equivalents to 2.0-fold equivalents of the target substitution equivalent is also preferred.

Additional Component

In an embodiment of the present invention, an acid catalyst may be used to promote the esterification reaction. Examples of the acid catalyst include, but are not limited to, inorganic acids, organic acids, and Lewis acids; specifically, sulfuric acid, hydrochloric acid, toluenesulfonic acid, phenolsulfonic acid, aluminum chloride, zinc chloride, and boron trifluoride). In an embodiment of the present invention, the esterification reaction proceeds by using the specific basic ionic liquid under conditions where a high shear force is applied, and thus this typically eliminates the need for using an acid catalyst. Rather, an acid catalyst is preferably not used (i.e., intentionally not blended) from the viewpoints of the safety in the work process and reducing the manufacturing cost.

Next, the method for production an esterified polysaccharide product according to an embodiment of the present invention will be described.

The method for producing an esterified polysaccharide product according to an embodiment of the present invention is characterized by reacting:
   a polysaccharide-containing biomass,
   a specific basic ionic liquid, and
   an esterifying agent
using a kneader equipped with a shear force application mechanism.

In the method for producing an esterified polysaccharide product according to an embodiment of the present invention, the three components, which are the polysaccharide-containing biomass, the specific basic ionic liquid, and the esterifying agent, may be simultaneously fed into a kneader equipped with a shear force application mechanism and reacted. A concentration of the polysaccharide-containing biomass in the three components when the three components are kneaded simultaneously is not particularly limited, but is, for example, from 5 to 35 wt. %, preferably from 7 to 35 wt. %, and more preferably from 10 to 35 wt. %.

In addition, after any two components (e.g., the polysaccharide-containing biomass and the specific basic ionic liquid) may be mixed in advance, the remaining one component (the esterifying agent) may be added and mixed, and then the mixture may be reacted using a kneader equipped with a shear force application mechanism.

From the viewpoints that the method is based on a homogeneous reaction and allows the esterification reaction to proceed industrially efficiently, the method preferably includes:
   kneading the polysaccharide-containing biomass and the specific basic ionic liquid to produce a first kneaded product (first kneading); and
   kneading and react the esterifying agent and the first kneaded product to produce a second kneaded product containing an esterified polysaccharide product (second kneading),
   in which the kneader equipped with a shear force application mechanism is used at least one of the first kneading or the second kneading.

Kneader Equipped with a Shear Force Application Mechanism

Using a kneader equipped with a shear force application mechanism enables the components to be homogeneously mixed and kneaded in a short time even under high concentration conditions, for example, under such a condition that result in a final concentration of the esterified polysaccharide product exceeding 30 wt. %, and such a kneader enables the esterification reaction to proceed efficiently in the homogeneous system. In addition, sufficient shear force is applied to the reactants, and thus this can reduce the reaction reagents used in the process (e.g., the specific basic ionic liquid, the esterifying agent, and organic solvents). Furthermore, along with the reduction of the reaction reagents, a volume of the resulting esterified polysaccharide product is also reduced. And thus this can also reduce a reagent (e.g., methanol) used in a process of purification by sedimentation. The efficiency is thus improved in the entire system, and thus this also contributes to the cost reduction of the manufacturing process.

Examples of the kneader equipped with a shear force application mechanism include a vibrating kneader (an apparatus that applies a strong circular motion to a drum body containing several cylindrical rods to apply compression, impact, and shear to raw materials between the rods or between the rods and the drum to mix and knead the raw materials), a wheel-rotating type (which may be referred to as a "Muller Mixer"), a vertical agitator blade type, a single-screw rotating type (which may be referred to as a "single-screw extruder"), and a multi-screw rotating type. In particular, from the viewpoint of capability to apply a stronger shear force to a material to be kneaded, a kneader equipped with a screw is preferable, such as a vertical agitator blade type, a single-screw rotating type, and a multi-screw rotating type.

Among the kneaders equipped with a screw, because of generality and versatility, a multi-screw rotating type is more preferred, and in particular, a twin-screw rotating kneader (which may also be referred to as a "twin-screw kneader" or a "twin-screw kneading extruder") is preferred. In addition, using a continuous kneader, such as the single-screw rotating type or the multi-screw rotating type, enables the first kneading, the second kneading, and an extrusion described later to be performed continuously and efficiently.

For the type of the multi-screw rotating kneader, various types, such as a screw shaft shape and a screw rotating direction, can be appropriately selected from the viewpoint of workability and the like. For example, the screw shafts may be either those with parallel screw axes or conical type screws with oblique axes. The screws may be either an engaging type or a non-engaging type. For the screw rotating direction, either a codirectionally rotating type or a counter-directionally rotating type may be used.

The screw rotation rate can be appropriately adjusted but is in a range, for example, from 30 to 150 rpm. With adjustment of the screw rotation rate, the kneading time (residence time, reaction time) of materials to be kneaded in the kneader can be adjusted.

The kneading time can be appropriately adjusted as described in each process described later. Kneading in the kneader equipped with a screw enables the reactants to be conveyed and extruded while maintaining sufficient residence time.

The kneader equipped with a shear force application mechanism is preferably equipped with a temperature control mechanism. For such a temperature control mechanism (warming, cooling, or heat retention), a known temperature control mechanism can be employed, and examples include, but are not limited to, electrical or hot water heaters. The kneader equipped with a shear force application mechanism also equipped with a temperature control mechanism controls the temperature of materials to be kneaded in the manufacturing process, thus can further improve the work efficiency, and can adjust the degree of substitution of the esterified polysaccharide product as well. The temperature for heating can be appropriately set at a range, for example, of 40 to 200° C. The kneaded materials that are heated may be cooled as necessary, and the temperature in this case is, for example, 100° C. or lower, preferably 80° C. or lower, and more preferably 70° C. or lower.

First Kneading

The first kneading is to knead the polysaccharide-containing biomass and the specific basic ionic liquid to dissolve the polysaccharide-containing biomass and to produce a first kneaded product. In the first kneading, the specific basic ionic liquid exerts a role as a solvent in which the polysaccharide-containing biomass is dissolved. A concentration of the polysaccharide-containing biomass in the specific basic ionic liquid is, for example, from 5 to 70 wt. %, preferably from 10 to 65 wt. %, more preferably from 20 to 65 wt. %, even more preferably from 30 to 63 wt. %, and particularly preferably from 40 to 60 wt. %. In the first kneading, the organic solvent described above may be used as necessary. A concentration of the polysaccharide-containing biomass in the organic solvent is, for example, from 5 to 70 wt. %, preferably from 10 to 65 wt. %, more preferably from 20 to 65 wt. %, even more preferably from 30 to 63 wt. %, and particularly preferably from 40 to 60 wt. %.

A weight ratio of the specific basic ionic liquid to the polysaccharide-containing biomass is, for example, from 0.5 to 10 of the specific basic ionic liquid per 1 of the polysaccharide-containing biomass. In addition, the weight ratio of the specific basic ionic liquid to the polysaccharide-containing biomass is, for example, from 0 to 10 of the specific basic ionic liquid per 1 of the polysaccharide-containing biomass.

The kneading conditions (temperature and time) in the first kneading may be any conditions in which the specific basic ionic liquid can function as a solvent for the polysaccharide-containing biomass. The kneading temperature is, for example, from 40 to 180° C. (preferably from 60 to 150° C. and more preferably from 80 to 120° C.), and the kneading time is, for example, 0.1 minutes or longer, more preferably 0.2 minutes or longer, even more preferably 0.3 minutes or longer, and several days (e.g., 3 days) or shorter, preferably 2 hours or shorter, more preferably 1 hour or shorter, even more preferably 30 minutes or shorter, particularly preferably 15 minutes or shorter (e.g., 10 minutes or shorter and preferably 5 minutes or shorter).

In a preferred embodiment, when the first kneading is performed using a kneader equipped with a screw, the polysaccharide-containing biomass (e.g., a biomass in a solid state containing a polysaccharide) and the basic ionic liquid may be simultaneously introduced directly above the screw of the kneader. The introduced raw materials are fed into a kneading zone in the kneader by the screw and can be simultaneously dissolved and kneaded efficiently. The raw materials are typically introduced via a raw material feed section attached to the kneader. Examples of a hopper attached to the raw material feed section include an oscillating hopper, a hopper with a forced feeder, a hopper dryer, a vacuum hopper, and a nitrogen purge hopper. In addition, a device for feeding constant amounts of the introduced raw materials to the kneader equipped with a screw may be attached under the hopper.

Second Kneading

The second kneading is to knead and react the esterifying agent and the first kneaded product to produce a second kneaded product containing an esterified polysaccharide product. In the second kneading, the specific basic ionic liquid in the first kneaded product may act as a catalyst. In the second kneading, the organic solvent described above may be used as necessary.

The amount of the esterifying agent can be appropriately selected according to various conditions, such as the type of polysaccharide in the polysaccharide-containing biomass, the type of the esterifying agent, the reaction temperature, the reaction time (residence time, holding time), and kneading conditions. The amount the esterifying agent is, for example, from 0.5 to 20 equivalents relative to 1 equivalent of hydroxyl groups of the polysaccharide.

A weight ratio of the polysaccharide-containing biomass to the esterifying agent can be appropriately selected according to the type of the esterifying agent or the type of polysaccharide contained, but the weight ratio of the esterifying agent to the polysaccharide-containing biomass may be within a range, for example, from 0.5 to 10 of the esterifying agent per 1 of the polysaccharide-containing biomass.

In the second kneading, the organic solvent described above may be further used as necessary. The kneading conditions (temperature and time) are any conditions where the esterification reaction proceeds efficiently. The kneading temperature is, for example, from 40 to 180° C. (preferably from 60 to 150° C. and more preferably from 80 to 120° C.), and the kneading time is, for example, 0.1 minutes or longer, more preferably 0.2 minutes or longer, even more preferably 0.3 minutes or longer, and several days (e.g., 3 days) or shorter, preferably 2 hours or shorter, more preferably 1 hour or shorter, even more preferably 30 minutes or shorter, particularly preferably 15 minutes or shorter (e.g., 10 minutes or shorter and preferably 5 minutes or shorter).

In a preferred embodiment, the residence time (reaction time) in the process of the materials to be kneaded in the second kneading is, for example, within 2 hours, more preferably within 1 hour, even more preferably within 30 minutes, and particularly preferably within 10 minutes. The second kneading with a residence time within 2 hours can significantly reduce the reaction time of the esterification over the method in the related art. In the second kneading, a degree of substitution of the esterified polysaccharide product can be controlled to a desired range by the residence time and kneading temperature. In particular, the second kneading with an extremely short residence time of approximately 10 minutes has a superior effect of preventing the reduction in molecular weight of the polysaccharide. In addition, the second kneading with such an extremely short time can further prevent the occurrence of a side reaction specific to the basic ionic liquid.

Extruding

Extruding is to extrude the second kneaded product. The extruding may involve conveying the second kneaded product. The extrusion temperature conditions are, for example, from 40 to 180° C. (preferably from 60 to 150° C. and more preferably from 80 to 120° C.). The extrusion time can be appropriately adjusted by the device used. When the first kneading and the second kneading are performed using different kneaders, the extrusion may be performed to extrude the first kneaded product. Also in this case, the extrusion may involve conveying the first kneaded product, and the extrusion temperature conditions are as already described. In a preferred embodiment, for example, when a continuous kneading equipment, such as a single-screw extruder or a twin-screw kneading extruder, is used, the second kneaded product can be continuously extruded by adjusting the residence time to the range described above. In the extruding, the organic solvent described above may be used as necessary.

From the viewpoints of shortening the reaction time and improving the work efficiency, at least one of the first kneading, the second kneading, or the extruding is preferably performed continuously.

From the viewpoints of shortening the reaction time and improving the work efficiency, the kneader equipped with a shear force application mechanism is preferably used in at least two of the first kneading, the second kneading, or the extruding.

In the present specification, "continuously" has the following meanings.

Continuously performing the first kneading refers to kneading the polysaccharide-containing biomass and the specific basic ionic liquid that are fed in constant amounts in a continuous manner and producing a first kneaded product.

Continuously performing the second kneading refers to kneading and reacting the first kneaded product and the esterifying agent that are fed in constant amounts in a continuous manner and producing a second kneaded product containing an esterified polysaccharide product.

Continuously performing the extrusion refers to extruding the second kneaded product in a continuous manner that is fed in a constant amount in a continuous manner.

Additional Process

The method for producing an esterified polysaccharide product according to an embodiment of the present invention can also include an additional process (e.g., a conveying process to convey the first or second kneaded product, or a forming process) in addition to the processes described above, and an additional kneading (e.g., a third kneading or a fourth kneading) by further connecting to another kneader.

In a preferred embodiment, employing a continuous kneader, such as a single-screw rotating type or a multi-screw rotating type, (preferably a twin-screw kneading extruder) as the kneader equipped with a shear force application mechanism enables the first kneading, the second kneading, and the extruding to be performed continuously.

For example, employing a twin-screw kneading extruder not only allows the polysaccharide-containing biomass to be well dissolved in the specific basic ionic liquid but also enables a shearing action applied to the first kneaded product. As a result of kneading in the first kneading, the first kneaded product is homogeneously dissolved, and the viscosity is maintained suitable for kneading at the time of the reaction with the esterifying agent. Thus, the reaction of the esterifying agent and the first kneaded product proceeds more efficiently and can produce the second kneaded product containing the esterified polysaccharide product. In addition, all the raw materials (the polysaccharide-containing biomass, the specific basic ionic liquid, the esterifying agent, and an organic solvent or the like as necessary) are fed continuously in predetermined amounts, and thus this can continuously produce a constant amount of the esterified polysaccharide product.

In the process described above, the resulting reaction product is subjected to reprecipitation, filtration, or the like using a solvent such as methanol, and a desired esterified polysaccharide product can be obtained. For example, when bagasse as the polysaccharide-containing biomass is used as a raw material, an esterified cellulose product is produced by reprecipitation, and a lignin derivative can be further obtained from the filtrate. The specific basic ionic liquid used in the reaction can be recovered and reused.

The produced esterified polysaccharide product can also be converted to another polysaccharide derivative for the purpose of modification or the like. The conversion method is not particularly limited; for example, a method known in the art using a base such as NaOH, or an acid catalyst such as sulfuric acid, may be employed, and the esterified polysaccharide product may be further reacted with a reaction reagent such as an esterifying agent of various types, in the presence of the specific basic ionic liquid, or an esterifying agent such as an acid halide may be reacted with the esterified polysaccharide product in the absence of the specific basic ionic liquid.

Next, the esterified polysaccharide product produced by the method for producing an esterified polysaccharide product according to an embodiment of the present invention will be described.

A final concentration of the esterified polysaccharide product produced by the method for producing an esterified polysaccharide product according to an embodiment of the present invention is not particularly limited, but is, for example, 20 wt. % or higher and preferably 30 wt. % or higher. Here, the final concentration of the esterified polysaccharide product refers to the weight proportion (%) of the esterified polysaccharide product relative to the total amount of the reaction mixture after completion of the esterification reaction. In the present specification, "high concentration" refers to a concentration, for example, of 20 wt. % or higher in terms of the final concentration of the esterified polysaccharide product.

A content of a cellulose ester in the esterified polysaccharide product produced by an embodiment of the present invention is, for example, 80 wt. % or higher, preferably 85 wt. % or higher, more preferably 90 wt. % or higher, and even more preferably 95 wt. % or higher.

In the esterified polysaccharide product produced by an embodiment of the present invention, an esterification ratio of hydroxyl groups of polysaccharide in the polysaccharide-containing biomass is, for example, 23% or higher, preferably 25% or higher, and more preferably 30% or higher.

A total degree of substitution of the esterified polysaccharide product in the case where the esterified polysaccharide product produced by an embodiment of the present invention is a cellulose ester can be appropriately set according to the intended use but is, for example, 0.7 or higher, and can be freely adjusted in a range up to 3.0 according to the application (e.g., 0.9 or higher, 1.0 or higher, 1.1 or higher, 1.3 or higher, 2.0 or higher, 2.2 or higher, 2.4 or higher, or 2.6 or higher). The total degree of substitution is a total sum of the degree of substitution of each substituent attached to the three hydroxyl groups present in glucose, the basic unit of cellulose. The cellulose ester with a total degree of substitution of 1.0 or higher is easily form-processed with an organic solvent or by heating. In addition, an embodiment of the present invention can also produce a cellulose ester with a total degree of substitution, for example, 2.0 or higher, approximately the same as that of a versatile cellulose ester.

The application of the esterified polysaccharide product obtained by an embodiment of the present invention is not particularly limited and can be used, for example, in the field of fibers, such as fibers, ropes, nets, woven and knitted fabrics, felt, fleece, wood plastics, carbon fiber composite materials, glass fiber composite materials, cellulose nanofiber composite materials, lignocellulose nanofiber composite materials, and other fiber composite materials; the field of films, such as polarizing plate protective films and optical films; the field of plastics, such as medical devices, electronic component materials, packaging materials, eyeglass frames, pipes, bars, tools, tableware, and toys; and civil engineering-related fields, such as concrete viscosity modifiers and clay mineral viscosity modifiers.

EXAMPLES

Hereinafter, the present invention will be described more specifically with reference to examples, but the present invention is not limited by these examples.

A kneader equipped with a shear force application mechanism used in the examples is schematically illustrated in FIG. 1. Details of the specifications are as follows.

Product name: ULTnano 20TW-20MG-NH(-600), Twin Screw Compounding Tester (hereinafter referred to as the twin-screw kneading extruder of FIG. 1)

Manufacturer: TECHNOVEL CORPORATION

Screw Size: $\varphi$=20 mm, L/D=20 D

Screw rotating direction: codirectional type

Heater zone (temperature control zone): C (Cylinder) 1, C2, C3, H/D, 4 portions in total Screw elements: Conveying, Mixing, and Kneading, three types in total, were used Example 1

To prepare a sample, a cellulose (100 g, "Avicel PH-101" (trade name) from Sigma-Aldrich, number average degree of polymerization 105) was weighed into a 500-mL conical beaker and dried under reduced pressure overnight. Then, 1-ethyl-3-methylimidazolium acetate (50 g) and dimethyl sulfoxide (150 g) were weighed into a large-volume empty bottle, mixed, and stirred for several minutes. In advance, the temperatures of the C1, C2, C3, and H/D portions of the twin-screw kneading extruder of FIG. 1 were set at 120° C. and increased. The screw rotation rate was set at 60 rpm. Three samples of the cellulose, the mixture of 1-ethyl-3-methylimidazolium acetate and dimethyl sulfoxide prepared, and vinyl laurate were fed in the following manner. The cellulose was fed at 0.529 (g/min) from a feed port F1 located before C1 using a feeder (not illustrated) mounted in the twin-screw kneading extruder of FIG. 1. The mixture of 1-ethyl-3-methylimidazolium acetate and dimethyl sulfoxide, and vinyl laurate were each fed using separate metering pumps (not illustrated); the mixture of 1-ethyl-3-methylimidazolium acetate and dimethyl sulfoxide was fed at 1.95 mL/min from the feed port F1 located before C1 and vinyl laurate was fed at 2.70 mL/min from an F2 portion of C2. After confirming that the mixture starting to exit an outlet of the twin-screw kneading extruder of FIG. 1 started to change color, the mixture was collected every 2 minutes and sampled three times. From the resulting collected product, 500 mg was weighed, washed with 20 mL of methanol repeatedly three times, then the collected product was dried under reduced pressure overnight, and a solid was obtained. Analytical results of IR and $^1$H NMR measurements confirmed that the collected product was a target cellulose laurate ester. Analytical results of the product sampled at three points revealed that the total degree of substitution was 2.6 and the production rate of the product was 1.8 g/min.

IR (ATR, cm$^{-1}$) 1738.; $^1$H NMR (600 MHz, CDCl$_3$) δ; 5.5-3.0 (br), 2.5-0.8 (br).

Example 2

To prepare a sample, a cellulose (100 g, "Avicel PH-101" (trade name) from Sigma-Aldrich, number average degree of polymerization 105) was weighed into a 500-mL conical beaker and dried under reduced pressure overnight. Then, 1-ethyl-3-methylimidazolium acetate (50 g) and dimethyl sulfoxide (150 g) were weighed into a large-volume empty bottle, mixed, and stirred for several minutes. In advance, the temperatures of the C1, C2, C3, and H/D portions of the twin-screw kneading extruder of FIG. 1 were set at 100° C. and increased. The screw rotation rate was set at 60 rpm. Three samples of the cellulose, the mixture of 1-ethyl-3-methylimidazolium acetate and dimethyl sulfoxide prepared, and vinyl laurate were fed in the following manner. The cellulose was fed at 0.529 (g/min) from the feed port F1 located before C1 using a feeder (not illustrated) mounted in the twin-screw kneading extruder. The mixture of 1-ethyl-3-methylimidazolium acetate and dimethyl sulfoxide, and vinyl laurate were each fed using separate metering pumps (not illustrated); the mixture of 1-ethyl-3-methylimidazolium acetate and dimethyl sulfoxide was fed at 1.95 mL/min from the feed port F1 located before C1 and vinyl laurate was fed at 2.70 mL/min from the F2 portion of C2. After confirming that the mixture starting to exit the outlet of the twin-screw kneading extruder of FIG. 1 started to change color, the mixture was collected every 2 minutes and sampled three times. From the resulting collected product, 500 mg was weighed, washed with 20 mL of methanol repeatedly three times, then the collected product was dried under reduced pressure overnight, and a solid was obtained. Analytical results of IR and $^1$H NMR measurements confirmed that the collected product was a target cellulose laurate ester. Analytical results of the product sampled at three points revealed that the total degree of substitution was 2.4 and the production rate of the product was 1.7 g/min.

IR (ATR, cm$^{-1}$) 1738.; $^1$H NMR (600 MHz, CDCl$_3$) δ; 5.5-3.0 (br), 2.5-0.8 (br).

Example 3

To prepare a sample, a cellulose (100 g, "Avicel PH-101" (trade name) from Sigma-Aldrich, number average degree of polymerization 105) was weighed into a 500-m conical beaker and dried under reduced pressure overnight. Then, 1-ethyl-3-methylimidazolium acetate (50 g) and dimethyl sulfoxide (150 g) were weighed into a large-volume empty bottle, mixed, and stirred for several minutes. In advance, the temperatures of the C1, C2, C3, and H/D portions of the twin-screw kneading extruder were set at 80° C. and increased. The screw rotation rate was set at 60 rpm. Three samples of the cellulose, the mixture of 1-ethyl-3-methylimidazolium acetate and dimethyl sulfoxide prepared, and vinyl laurate were fed in the following manner. The cellulose was fed at 0.529 (g/min) from the feed port F1 located before C1 using a feeder (not illustrated) mounted in the twin-screw kneading extruder of FIG. 1. The mixture of 1-ethyl-3-methylimidazolium acetate and dimethyl sulfoxide, and vinyl laurate were each fed using separate metering pumps (not illustrated); the mixture of 1-ethyl-3-methylimidazolium acetate and dimethyl sulfoxide was fed at 1.95 mL/min from the feed port F1 located before C1 and vinyl laurate was fed at 2.70 mL/min from the F2 portion of C2. After confirming that the mixture starting to exit the outlet of the twin-screw kneading extruder of FIG. 1 started to change color, the mixture was collected every 2 minutes and sampled three times. From the resulting collected product, 500 mg was weighed, washed with 20 mL of methanol repeatedly three times, then the collected product was dried under reduced pressure overnight, and a solid was obtained. Analytical results of IR and $^1$H NMR measurements confirmed that the collected product was a target cellulose laurate ester. Analytical results of the product sampled at three points revealed that the total degree of substitution was 2.2 and the production rate of the product was 1.6 g/min.

IR (ATR, cm$^{-1}$) 1738.; $^1$H NMR (600 MHz, CDCl$_3$) δ; 5.5-3.0 (br), 2.5-0.8 (br).

Example 4

To prepare a sample, a cellulose (100 g, "Avicel PH-101" (trade name) from Sigma-Aldrich, number average degree of polymerization 105) was weighed into a 500-mL conical beaker and dried under reduced pressure overnight. Then, 1-ethyl-3-methylimidazolium acetate (50 g) and dimethyl sulfoxide (150 g) were weighed into a large-volume empty bottle, mixed, and stirred for several minutes. In advance, the temperatures of the C1, C2, C3, and H/D portions of the twin-screw kneading extruder were set at 80° C. and increased. The screw rotation rate was set at 60 rpm. Three samples of the cellulose, the mixture of 1-ethyl-3-methylimidazolium acetate and dimethyl sulfoxide prepared, and isopropenyl acetate were fed in the following manner. The cellulose was fed at 0.76 (g/min) from the feed port F1 located before C1 using a feeder (not illustrated) mounted in the twin-screw kneading extruder of FIG. 1. The mixture of 1-ethyl-3-methylimidazolium acetate and dimethyl sulfoxide, and isopropenyl acetate were each fed using separate metering pumps (not illustrated); the mixture of 1-ethyl-3- methylimidazolium acetate and dimethyl sulfoxide was fed at 2.79 mL/min from the feed port F1 located before C1 and isopropenyl acetate was fed at 1.57 mL/min from the F2 portion of C2. After confirming that the mixture starting to exit the outlet of the twin-screw kneading extruder of FIG. 1 started to change color, the mixture was collected every 2 minutes and sampled three times. From the resulting collected product, 500 mg was weighed, washed with 20 mL of methanol repeatedly three times, then the collected product was dried under reduced pressure overnight, and a solid was obtained. Analytical results of IR and $^1$H NMR measurements confirmed that the collected product was a target cellulose acetate ester. Analytical results of the product sampled at three points revealed that the total degree of substitution was 1.1 and the production rate of the product was 0.9 g/min.

IR (ATR, cm$^{-1}$) 1738.; $^1$H NMR (600 MHz, CDCl$_3$) δ; 5.3-3.4 (br), 2.2-1.8 (br).

Example 5

To prepare a sample, a cellulose (100 g, "Avicel PH-101" (trade name) from Sigma-Aldrich, number average degree of polymerization 105) was weighed into a 500-mL conical beaker and dried under reduced pressure overnight. Then, 1-ethyl-3-methylimidazolium acetate (50 g) and dimethyl sulfoxide (150 g) were weighed into a large-volume empty bottle, mixed, and stirred for several minutes. In advance, the temperatures of the C1, C2, C3, and H/D portions of the twin-screw kneading extruder of FIG. 1 were set at 120° C. and increased. The screw rotation rate was set at 60 rpm. Three samples of the cellulose, the mixture of 1-ethyl-3-methylimidazolium acetate and dimethyl sulfoxide prepared, and cinnamaldehyde were fed in the following manner. The cellulose was fed at 0.67 (g/min) from the feed port F1 located before C1 using a feeder (not illustrated) mounted in the twin-screw kneading extruder of FIG. 1. The mixture of 1-ethyl-3-methylimidazolium acetate and dimethyl sulfoxide, and cinnamaldehyde were each fed using separate metering pumps (not illustrated); the mixture of 1-ethyl-3-methylimidazolium acetate and dimethyl sulfoxide was fed at 2.44 mL/min from the feed port F1 located before C1 and cinnamaldehyde was fed at 1.56 mL/min from the F2 portion of C2. After confirming that the mixture starting to exit the outlet of the twin-screw kneading extruder of FIG. 1 started to change color, the mixture was collected every 2 minutes and sampled three times. From the resulting collected product, 500 mg was weighed, washed with 20 mL of methanol repeatedly three times, then the collected product was dried under reduced pressure overnight, and a solid was obtained. Analytical results of IR and $^1$H NMR measurements confirmed that the collected product was a target cellulose phenylpropionate ester. Analytical results of the product sampled at three points revealed that the total degree of substitution was 1.3 and the production rate of the product was 1.1 g/min.

IR (ATR, cm$^{-1}$) 1729.; $^1$H NMR (600 MHz, CDCl$_3$) δ; 8.0-6.5 (br), 5.5-3.0 (br), 3.0-2.5 (br).

Example 6

To prepare a sample, bagasse (sugar cane residue) was milled, and the particle size was adjusted to 150 μm or smaller by sieving. The bagasse (100 g) with the adjusted particle size was weighed into a 500-mL conical beaker and dried under reduced pressure overnight. Then, 1-ethyl-3-methylimidazolium acetate (50 g) and dimethyl sulfoxide (150 g) were weighed into a large-volume empty bottle, mixed, and stirred for several minutes. In advance, the temperatures of the C1, C2, C3, and H/D portions of the twin-screw kneading extruder were set at 120° C. and increased. The screw rotation rate was set at 60 rpm. Three samples of the bagasse, the mixture of 1-ethyl-3-methylimidazolium acetate and dimethyl sulfoxide prepared, and vinyl laurate were fed in the following manner. The bagasse was fed at 0.64 (g/min) from the feed port F1 located before C1 using a feeder (not illustrated) mounted in the twin-screw kneading extruder of FIG. 1. The mixture of 1-ethyl-3-methylimidazolium acetate and dimethyl sulfoxide, and vinyl laurate were each fed using separate metering pumps (not illustrated); the mixture of 1-ethyl-3-methylimidazolium acetate and dimethyl sulfoxide was fed at 2.36 mL/min from the feed port located before C1 and vinyl laurate was fed at 2.09 mL/min from the portion of C2. After confirming that the mixture starting to exit the outlet of the twin-screw kneading extruder of FIG. 1 started to change color, the mixture was collected every 2 minutes and sampled three times. From the resulting collected product, 1.0 g was weighed, washed with 20 mL of methanol repeatedly three times, then the collected product was dried under reduced pressure overnight, and a solid was obtained. Then, 100 mg of the resulting methanol-insoluble matter was dissolved in 5 mL of chloroform and filtered, and the filtrate was evaporated under reduced pressure, then vacuum-dried, and chloroform-soluble matter was obtained. Analytical results of IR measurement of the methanol-insoluble matter and $^1$H NMR measurement of the chloroform-soluble matter confirmed that the collected product was a target bagasse laurate ester. Analytical results of the products sampled at three points revealed that the production rate of the methanol-insoluble matter was 1.2 g/min.

IR (ATR, cm$^{-1}$) 1738.; $^1$H NMR (600 MHz, CDCl$_3$) δ; 5.5-3.0 (br), 2.5-0.8 (br).

Comparative Example 1

In a 20 mL Schlenk tube, a cellulose (120 mg, 2.22 mmol=[OH], "Avicel PH-101" (trade name) from Sigma-Aldrich, number average degree of polymerization 105) was dissolved in 1-ethyl-3-methylimidazolium acetate (4000 mg, 23.4 mmol) and dried under reduced pressure at 80° C. for 3 hours. A balloon filled with argon gas was attached to a reaction vessel, the inside of the vessel was purged with argon, and dehydrated dimethyl sulfoxide (4.0 mL, 113 mmol) was added. After confirming that the cellulose was homogeneously dissolved in the solution, vinyl laurate (9.2 mL, 37.9 mmol) was added into the reaction solution, and the solution was stirred at 120° C. for 18 hours. The reaction solution was added to an excess amount of methanol to precipitate insoluble matter. After filtration, the insoluble matter was further washed with methanol, and then collected. The insoluble matter was dried under reduced pressure conditions at 60° C. overnight, and 187 mg of a solid was obtained. Analytical results of IR and $^1$H NMR measurements confirmed that the collected product was a target cellulose laurate acetate mixed ester. The total degree of substitution of laurate was 2.03 and the total degree of substitution of acetate was 0.71.

IR (ATR, cm$^{-1}$) 1738.; $^1$H NMR (600 MHz, CDCl$_3$) δ; 5.5-3.0 (br), 2.5-0.8 (br).

Comparative Example 2

To prepare a sample, a cellulose (100 g, "Avicel PH-101" (trade name) from Sigma-Aldrich, number average degree of polymerization 105) was weighed into a 500-mL conical beaker and dried under reduced pressure overnight. Then, 1-butyl-3-methylimidazolium chloride (50 g) and dimethyl sulfoxide (150 g) were weighed into a large-volume empty bottle, mixed, and stirred for several minutes. In advance, the temperatures of the C1, C2, C3, and H/D portions of the twin-screw kneading extruder of FIG. 1 were set at 120° C. and increased. The screw rotation rate was set at 60 rpm. Three samples of the cellulose, the mixture of 1-butyl-3-methylimidazolium chloride and dimethyl sulfoxide prepared, and vinyl laurate were fed in the following manner. The cellulose was fed at 0.529 (g/min) from the feed port located before C1 using a feeder (not illustrated) mounted in the twin-screw kneading extruder of FIG. 1. The mixture of 1-butyl-3-methylimidazolium chloride and dimethyl sulfoxide, and vinyl laurate were each fed using separate metering pumps (not illustrated); the mixture of 1-butyl-3-methylimidazolium chloride and dimethyl sulfoxide was fed at 1.95 mL/min from the feed port located before C1 and vinyl laurate was fed at 2.70 mL/min from the portion of C2. After confirming that the mixture starting to exit the outlet of the twin-screw kneading extruder of FIG. 1 started to change color, the mixture was collected every 2 minutes and sampled three times. From the resulting collected product, 500 mg was weighed, washed with 20 mL of methanol repeatedly three times, then the collected product was dried under reduced pressure overnight, and a solid was obtained. Analytical results of IR measurement observed almost no peaks originating from an ester group and confirmed that the collected product was the cellulose used as the starting raw material.

Considerations of Results

The results above confirmed the following.

(1) Examples improved the total degree of substitution by about 10 times compared to the related arts (see paragraphs [0005] and [0006]). Comparison of Examples 2 and 3 reveals that adjusting the temperature enables production of an esterified polysaccharide product with any degree of substitution.

(2) In Examples, the amounts of the organic solvent and reagent (the ionic liquid and the esterifying agent) were reduced to about one twentieth compared to those in Comparative Example 1.

(3) In Examples, the reaction time was shortened to about one two-hundredth compared to Comparative Example 1.

(4) In Comparative Example 2, in which the specific basic ionic liquid was not used, an esterified polysaccharide product was not produced.

(5) Using the twin-screw kneading extruder of FIG. 1 enabled continuous production. That is, as long as the raw materials were fed in constant amounts, a constant amount of the target product was produced. This reveals that the production scale can be easily enlarged.

Thus, with the method for producing an esterified polysaccharide product according to an embodiment of the present invention, industrially efficient production of an esterified polysaccharide product can be achieved. In particular, using the twin-screw kneading extruder of FIG. 1 as the kneader equipped with a shear force application mechanism enables the components to be homogeneously kneaded and reacted by high shear force even under high concentration conditions that result in a final concentration of the esterified polysaccharide product exceeding 30 wt. %. Thus, the method allows the specific basic ionic liquid to exert its functions as a solvent and a catalyst more effectively. In addition, the results confirmed continuous productivity, that is, as long as the raw materials are fed in constant amounts, a constant amount of the esterified polysaccharide product can be continuously produced.

To summarize the above, configurations of the present invention and their variations will be additionally described below.

(1) A method for producing an esterified polysaccharide product, the method including reacting:
a polysaccharide-containing biomass,
a basic ionic liquid with a pKa of a conjugate acid of an anion from 2 to 19 (preferably from 3 to 17, more preferably from 4 to 12, and even more preferably from 4.5 to 11) as a calculated value in a vacuum, and
an esterifying agent
using a kneader equipped with a shear force application mechanism.

(2) A method for producing an esterified polysaccharide product, the method including reacting:
a polysaccharide-containing biomass,
a basic ionic liquid with a pKa of a conjugate acid of an anion from 9 to 29 (preferably from 10 to 25, more preferably from 12 to 19, and even more preferably from 12.3 to 18.6) in dimethyl sulfoxide at 25° C., and
an esterifying agent
using a kneader equipped with a shear force application mechanism.

(3) The method for producing an esterified polysaccharide product according to (1) or (2) described above, in which a cation constituting the basic ionic liquid is one selected from the group consisting of an imidazolium cation, a pyridinium cation, and a tetraalkylammonium cation.

(4) The method for producing an esterified polysaccharide product according to any of (1) to (3) described above, in which the anion constituting the basic ionic liquid is one selected from the group consisting of a carboxylate anion, an amino acid anion, a cyanide ion, and a fluoride ion.

(5) A method for producing an esterified polysaccharide product, the method including reacting:
a polysaccharide-containing biomass,
a basic ionic liquid, and
an esterifying agent
using a kneader equipped with a shear force application mechanism, in which
the basic ionic liquid is an ionic liquid, in which a cation is represented by Formula (1):

[Chem. 2]

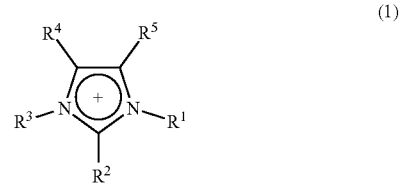

(1)

where $R^1$ and $R^2$ are each independently an alkyl group, an alkenyl group, an alkoxyalkyl group, or a substituted or unsubstituted phenyl group; and $R^3$ to $R^5$ are each independently a hydrogen atom, an alkenyl group, an alkoxyalkyl group, or a substituted or unsubstituted phenyl group; preferably, $R^1$ and $R^2$ are each independently an alkyl group, an alkenyl group, or a substituted or unsubstituted phenyl group; $R^3$ is a hydrogen atom; and $R^4$ and $R^5$ are each independently a hydrogen atom, an alkenyl group, or a substituted or unsubstituted phenyl group; and a pKa of a conjugate acid of an anion is from 2 to 19 as a calculated value in a vacuum.

(6) A method for producing an esterified polysaccharide product, the method including reacting:
a polysaccharide-containing biomass,
a basic ionic liquid, and
an esterifying agent
using a kneader equipped with a shear force application mechanism, in which
the basic ionic liquid has a solubility for a cellulose with a number average degree of polymerization of 105 in 1 g of the basic ionic liquid at 120° C. of 0.01 g or higher (preferably 0.05 g or higher, more preferably 0.1 g or higher, even more preferably 0.2 g or higher, and particularly preferably 0.3 g or higher).

(7) The method for producing an esterified polysaccharide product according to any of (1) to (6) described above, the method including:
kneading the polysaccharide-containing biomass and the basic ionic liquid to produce a first kneaded product (first kneading); and
kneading and react the esterifying agent and the first kneaded product to produce a second kneaded product containing an esterified polysaccharide product (second kneading),
in which the kneader equipped with a shear force application mechanism is used at least one of the first kneading or the second kneading.

(8) The method for producing an esterified polysaccharide product according to (7) described above, the method further including:
extruding the second kneaded product while conveying the second kneaded product,
in which the kneader equipped with a shear force application mechanism is used at least two of the first kneading, the second kneading, or the extruding.

(9) The method for producing an esterified polysaccharide product according to (8) described above, in which
at least one of the first kneading, the second kneading, or the extruding is performed continuously.

(10) The method for producing an esterified polysaccharide product according to (8) or (9) described above, in which
a kneader equipped with a screw is used in any of the first kneading, the second kneading, or the extruding.

(11) The method for producing an esterified polysaccharide product according to (10) described above, in which
when the first kneading is performed using a kneader equipped with a screw, the polysaccharide-containing biomass and the basic ionic liquid are simultaneously introduced directly above the screw of the kneader.

(12) The method for producing an esterified polysaccharide product according to any of (8) to (11) described above, in which an organic solvent is used in one or more of the first kneading, the second kneading, or the extruding.

(13) The method for producing an esterified polysaccharide product according to any of (1) to (12) described above, in which the esterifying agent is one or more selected from the group consisting of chain ester compounds, cyclic ester compounds, unsaturated aldehydes, saturated aldehydes, acid halides, acid anhydrides, and allyl alcohols.

(14) The method for producing an esterified polysaccharide product according to any of (1) to (13) described above, in which a weight ratio of the basic ionic liquid to the polysaccharide-containing biomass is from 0.5 to 10 (preferably from 0.7 to 7, more preferably from 0.8 to 3, even more preferably from 1 to 2.5, and particularly preferably from 1 to 1.5) of the basic ionic liquid per 1 of the polysaccharide-containing biomass.

(15) The method for producing an esterified polysaccharide product according to (12) described above, in which a weight ratio of the basic ionic liquid to the polysaccharide-containing biomass is from 0.5 to 10 (preferably from 0.7 to 7, more preferably from 0.8 to 3, even more preferably from 1 to 2.5, and particularly preferably from 1 to 1.5) of the basic ionic liquid per 1 of the polysaccharide-containing biomass, and a weight ratio of the organic solvent of the polysaccharide-containing biomass is from 0.5 to 10 (preferably from 0.7 to 7, more preferably from 0.8 to 3, even more preferably from 1 to 2.5, and particularly preferably from 1 to 1.5) of the organic solvent per 1 of the polysaccharide-containing biomass.

(16) The method for producing an esterified polysaccharide product according to any of (1) to (15) described above, in which a content of a cellulose ester in the esterified polysaccharide product is 80 wt. % or higher (preferably 85 wt. % or higher, more preferably 90 wt. % or higher, and even more preferably 95 wt. % or higher).

(17) The method for producing an esterified polysaccharide product according to any of (1) to (16) described above, in which an equivalent of the esterifying agent relative to 1 equivalent of hydroxyl groups of polysaccharide in the polysaccharide-containing biomass is from 0.5 to 7 equivalents (preferably from 0.7 to 7 equivalents).

(18) The method for producing an esterified polysaccharide product according to any of (1) to (17) described above, in which an esterification ratio of hydroxyl groups of polysaccharide in the polysaccharide-containing biomass is 23% or greater (preferably 25% or greater and more preferably 30% or greater).

(19) An esterified polysaccharide product produced by the method for producing an esterified polysaccharide product described in any of (1) to (18) described above.

(20) An esterified polysaccharide product produced by the method for producing an esterified polysaccharide product described in any of (1) to (18) described above, in which a total degree of substitution in the case where the esterified polysaccharide product is a cellulose ester is 0.7 or higher (preferably 0.9 or higher, 1.0 or higher, 1.1 or higher, 1.3 or higher, 2.0 or higher, 2.2 or higher, 2.4 or higher, or 2.6 or higher).

INDUSTRIAL APPLICABILITY

The method for producing an esterified polysaccharide product according to an embodiment of the present invention can industrially efficiently produce an esterified polysaccharide product.

REFERENCE SIGNS LIST

1 Twin-screw kneading extruder
11 Rotating shaft
12 Barrel
13a, 13b, 13c, 13d, 13e, 13f Screw
14 Cylinder
15 Head (H)/dice (D)
16 Outlet
21 Conveying part, using conveying element
22 First kneading part
22a Mixing part, using mixing element
22b Kneading part, using kneading element
23 Conveying part, using conveying element
24 Second kneading part, using kneading element 25 Extrusion part (conveying extrusion part), using conveying element
C1, C2, C3, 15 Warming zone
F1, F2 Raw material feed port

The invention claimed is:

1. A method for producing an esterified polysaccharide product, the method comprising:
reacting
a polysaccharide-containing biomass,
a basic ionic liquid with a pKa of a conjugate acid of an anion of 2 to 19 as a calculated value in a vacuum, and
an esterifying agent
using a kneader including a shear force application mechanism;
wherein said method comprises,
kneading the polysaccharide-containing biomass and the basic ionic liquid to produce a first kneaded product (first kneading); and
kneading and reacting the esterifying agent and the first kneaded product to produce a second kneaded product including an esterified polysaccharide product (second kneading),
wherein the kneader including a shear force application mechanism is used in at least one of the first kneading or the second kneading.

2. The method for producing an esterified polysaccharide product according to claim 1, wherein a cation constituting the basic ionic liquid is one selected from the group consisting of an imidazolium cation, a pyridinium cation, and a tetraalkylammonium cation.

3. The method for producing an esterified polysaccharide product according to claim 1, wherein the anion constituting the basic ionic liquid is one selected from the group consisting of a carboxylate anion, an amino acid anion, a cyanide ion, and a fluoride ion.

4. The method for producing an esterified polysaccharide product according to claim 1, the method further comprising:
extruding the second kneaded product while conveying the second kneaded product,
wherein the kneader including a shear force application mechanism is used in at least two of the first kneading, the second kneading, or the extruding.

5. The method for producing an esterified polysaccharide product according to claim 4, wherein
at least one of the first kneading, the second kneading, or the extruding is performed continuously.

6. The method for producing an esterified polysaccharide product according to claim 4, wherein
a kneader including a screw is used in any of the first kneading, the second kneading, or the extruding.

7. The method for producing an esterified polysaccharide product according to claim 6, wherein
the first kneading is performed using a kneader including a screw, and the polysaccharide-containing biomass and the basic ionic liquid are simultaneously introduced directly above the screw of the kneader.

8. The method for producing an esterified polysaccharide product according to claim 4, wherein an organic solvent is used in one or more of the first kneading, the second kneading, or the extruding.

9. The method for producing an esterified polysaccharide product according to claim 1, wherein the esterifying agent is one or more selected from the group consisting of a chain ester compound, cyclic ester compound, unsaturated aldehyde, saturated aldehyde, acid halide, acid anhydride, and allyl alcohol.

10. The method for producing an esterified polysaccharide product to claim 1, wherein a weight ratio of the basic ionic liquid to the polysaccharide-containing containing biomass is from 0.5 to 10 of the basic ionic liquid per 1 of the polysaccharide-containing biomass.

11. The method for producing an esterified polysaccharide product according to claim 8, wherein a weight ratio of the basic ionic liquid to the polysaccharide-containing biomass is from 0.5 to 10 of the basic ionic liquid per 1 of the polysaccharide-containing biomass, and a weight ratio of the organic solvent to the polysaccharide-containing biomass is from 0.5 to 10 of the organic solvent per 1 of the polysaccharide-containing biomass.

12. The method for producing an esterified polysaccharide product according to claim 1, wherein a content of a cellulose ester in the esterified polysaccharide product is 80 wt. % or greater.

13. The method for producing an esterified polysaccharide product according to claim 1, wherein an equivalent of the esterifying agent relative to 1 equivalent of hydroxyl groups of polysaccharide in the polysaccharide-containing biomass is from 0.5 to 7 equivalents.

14. The method for producing an esterified polysaccharide product according to claim 1, wherein an esterification ratio of hydroxyl groups of polysaccharide in the polysaccharide-containing biomass is 23% or greater.

15. An esterified polysaccharide product produced by the method for producing an esterified polysaccharide product described in claim 1.

16. The method for producing an esterified polysaccharide product according to claim 2, wherein the anion constituting the basic ionic liquid is one selected from the group consisting of a carboxylate anion, an amino acid anion, a cyanide ion, and a fluoride ion.

17. The method for producing an esterified polysaccharide product according to claim 12, the method comprising:
kneading the polysaccharide-containing biomass and the basic ionic liquid to produce a first kneaded product (first kneading); and
kneading and reacting the esterifying agent and the first kneaded product to produce a second kneaded product including an esterified polysaccharide product (second kneading),
wherein the kneader including a shear force application mechanism is used at least one of the first kneading or the second kneading.

* * * * *